United States Patent [19]

Ikeda

[11] Patent Number: 5,355,530
[45] Date of Patent: Oct. 11, 1994

[54] RECEIVER USING RECEIVING CONDITION SIGNAL FOR CORRECTING INFLUENCE OF THE RECEPTION BAND WIDTH

[75] Inventor: Masaharu Ikeda, Yokohama, Japan

[73] Assignee: Matsushita Electric Industrial Co., Ltd., Osaka, Japan

[21] Appl. No.: 848,718

[22] Filed: Mar. 9, 1992

[30] Foreign Application Priority Data

Mar. 20, 1991 [JP] Japan .................. 3-056592

[51] Int. Cl.⁵ .................... H04B 1/06; H04B 1/10
[52] U.S. Cl. .................... 455/212; 455/214; 455/219; 455/235.1; 455/240.1; 455/245.1
[58] Field of Search .......... 455/226.1, 235.1, 239.1, 455/240.1, 245.1, 246.1, 250.1, 295, 308, 309, 312, 336, 200, 205, 212, 219, 220, 221, 214, 225, 218

[56] References Cited

U.S. PATENT DOCUMENTS

| | | |
|---|---|---|
| 3,569,840 | 3/1971 | Tanaka et al. . |
| 4,103,240 | 7/1978 | Sakabe .................. 455/214 |
| 4,313,215 | 1/1982 | Jansen .................. 455/219 |
| 4,479,253 | 10/1984 | Daniel, Jr. . |
| 4,792,991 | 12/1988 | Eness .................... 455/214 |

FOREIGN PATENT DOCUMENTS

| | | |
|---|---|---|
| 0283401 | 9/1988 | European Pat. Off. . |
| 1122216 | 5/1989 | Japan . |
| 2056096 | 3/1981 | United Kingdom . |

Primary Examiner—Reinhard J. Eisenzopf
Assistant Examiner—Thanh C. Le
Attorney, Agent, or Firm—Stevens, Davis, Miller & Mosher

[57] ABSTRACT

For realizing a correct measurement of a receiving condition even if the bandwidth of intermediate frequency amplification is narrow, the gain of a variable gain amplitude detector circuit is controlled by an output signal of a function generator circuit so as to cancel the bandwidth characteristic of an intermediate frequency amplifier circuit, to flatten the total bandwidth characteristic of a circuit for detecting an amplitude value of a received signal, thereby eliminating the influence of angle modulation related components in the received signal or desired wave.

10 Claims, 12 Drawing Sheets

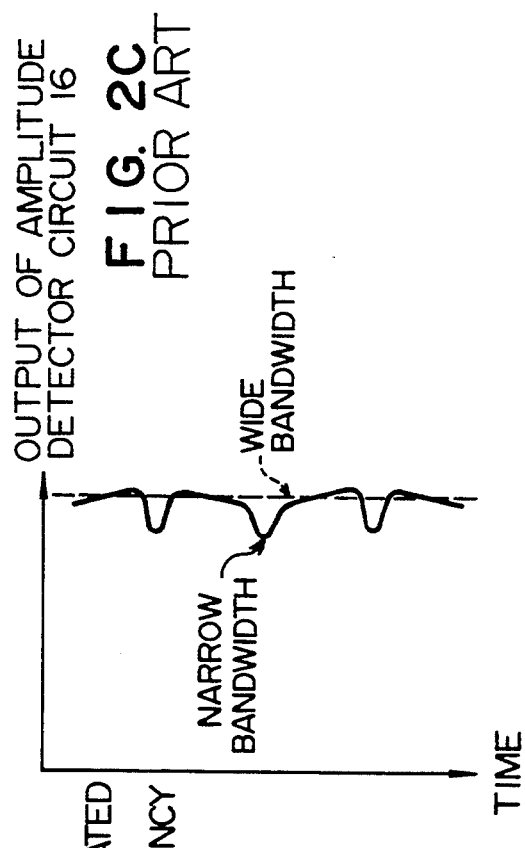
FIG. 2B PRIOR ART
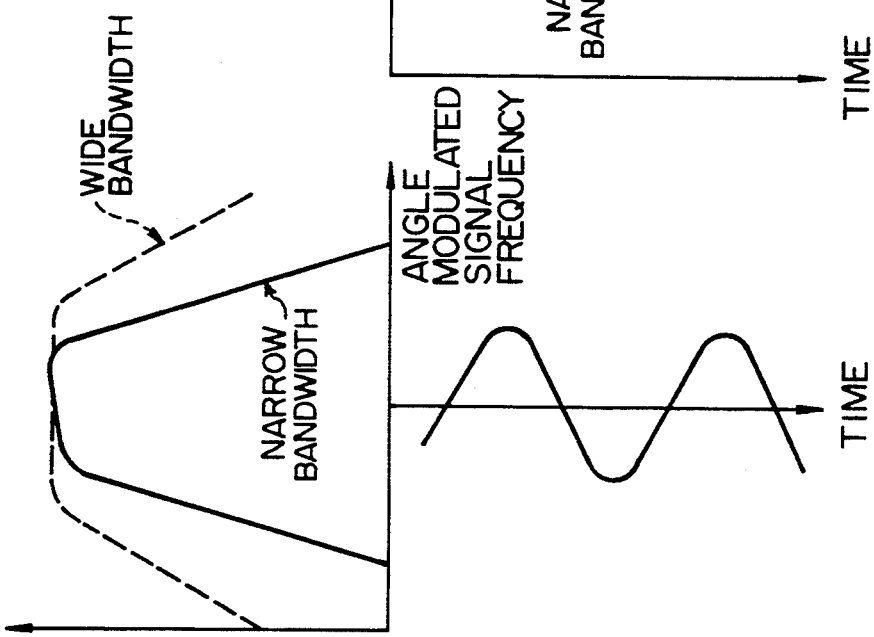
FIG. 2C PRIOR ART
FIG. 2A PRIOR ART

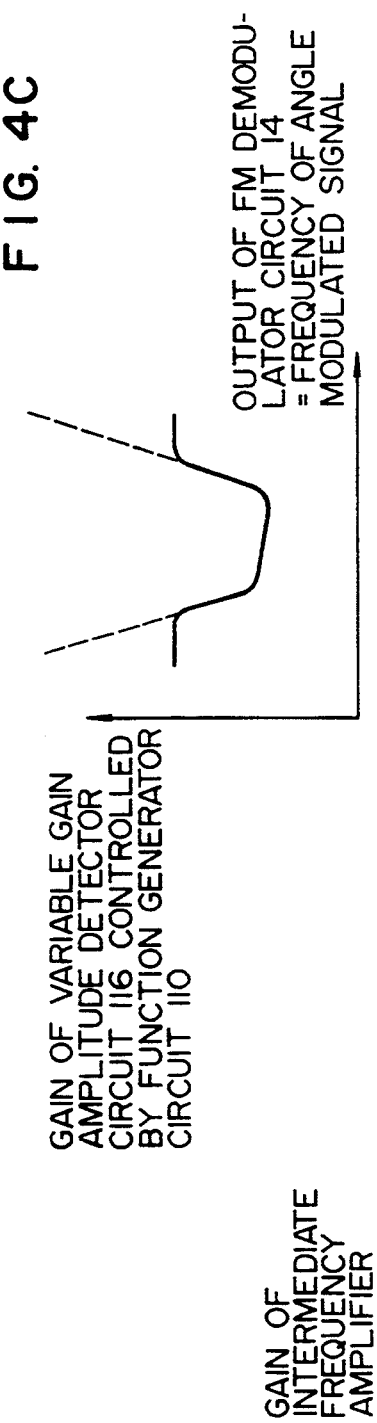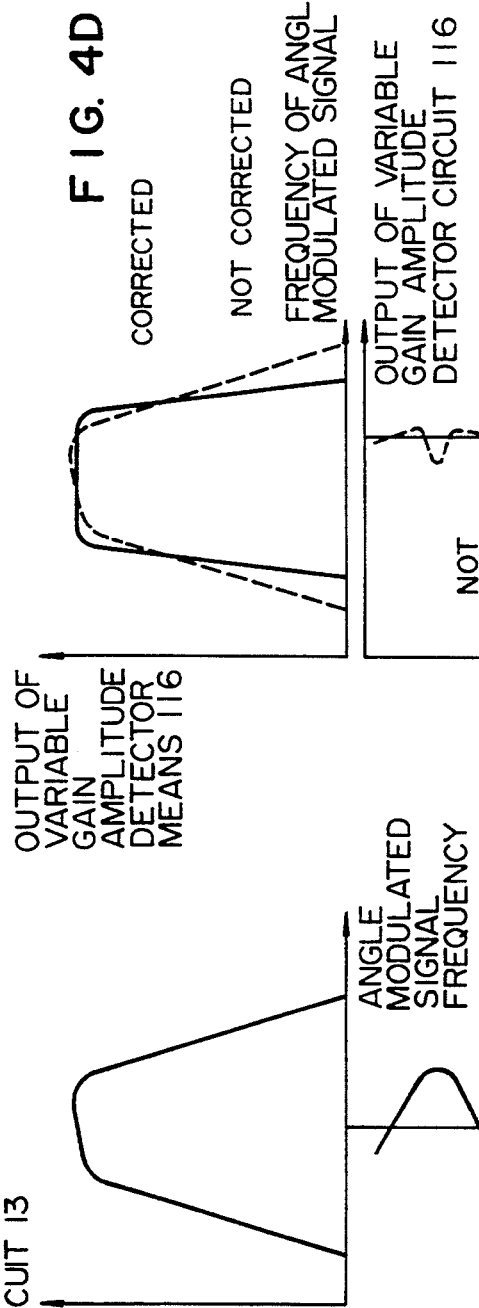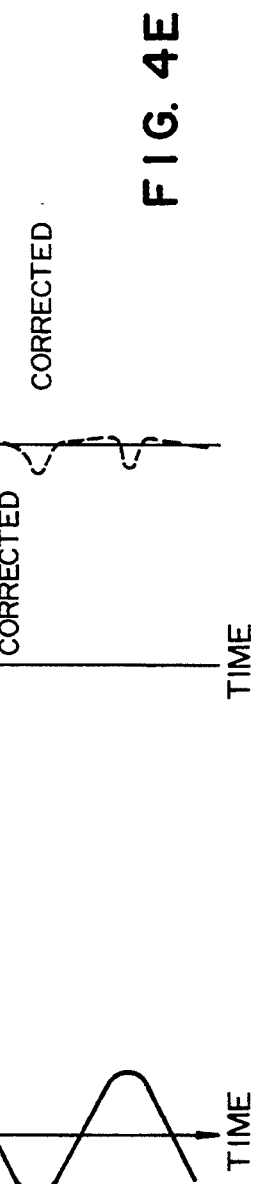

RECEIVER USING RECEIVING CONDITION SIGNAL FOR CORRECTING INFLUENCE OF THE RECEPTION BAND WIDTH

BACKGROUND OF THE INVENTION

1. Field of the Invention

The present invention relates to a receiver which utilizes a modulated signal modulated by an angle modulation system or the like to perform communications.

2. Description of the Prior Art

Conventionally, this type of receiver is described, for example, in JP-A-1-122216.

FIG. 1 is a block diagram illustrating the configuration of such a receiver for use in radio communications. In FIG. 1, reference numeral 1 designates an antenna, 11 a high frequency amplifier circuit for amplifying a received signal, 12 a frequency converter circuit for converting the amplified signal to an intermediate frequency signal, 13 an intermediate frequency amplifier, 14 a demodulator circuit for deriving a demodulated signal from the intermediate frequency signal, and 16 an amplitude detector circuit coupled to receive output signals from a plurality of cascade connected amplifiers arranged in the intermediate frequency amplifier 13 for detecting amplitude values of the respective output signals to output a voltage corresponding to an amplitude value of a synthesized received signal.

Incidentally, the intermediate frequency amplifier circuit 13, the demodulator circuit 14 and the amplitude detector circuit 16 may be readily implemented in an integrated circuit (IC).

Also, reference numeral 17 designates a capacitor, 18 a band pass filter and 19 an amplitude detector circuit which detects a change of an amplitude value of a received signal as a voltage together with the other amplitude detector circuit 16.

Further, reference numeral 4 designates a comparator circuit which compares an output signal from the amplitude detector circuit 19 with a threshold value set by a voltage source 5 and controls a variable transmitter circuit 15 to permit transmission, when a good receiving condition is present, to deliver an output signal of the demodulator circuit 14 to an output terminal 3.

Next, the operation of the above-mentioned configuration will be described.

In this example, if the magnitude of a desired wave is sufficiently larger than simultaneously received noise and internal noise generated by the high frequency amplifier circuit 11 and the frequency converter circuit 12, the desired wave itself does not have its amplitude modulated in a predetermined manner, so that the ratio of the desired wave signal to noise signals becomes large, even with these noises, and the amplitude of the desired wave presents only few changes, whereby a low voltage representative of a changing amount of the amplitude value of a received signal, generated by the amplitude detector circuit 19 becomes lower.

However, if the magnitude of a desired wave is small, noise received simultaneously with the desired wave together with noise generated inside the receiver causes the ratio of the desired wave signal to noise signals to become small and amplitude changes to become large, thereby increasing an output voltage representative of a detected changing amount of the amplitude value of the received signal or desired wave. In this event, when the comparator circuit 4 detects that the output voltage of the amplitude detector circuit 19 exceeds a threshold value indicating a predetermined receiving condition, the comparator circuit 4 controls the variable transmission circuit 15 so as not to deliver a demodulated output obtained from the demodulator circuit 14 to the output terminal 3.

On the other hand, when the antenna 1 receives a large amount of noise, even if the magnitude of a desired wave is large, the ratio of the desired wave to noise signals before demodulation as well as the same ratio of a demodulated signal are small, which indicates a bad receiving condition, thereby resulting in a higher output voltage from the amplitude detector circuit 19 representative of a changing amount of the amplitude value of the received signal.

Also in this case, the comparator circuit 4 controls the demodulator circuit 14 for the transmission of a demodulated output corresponding to the threshold value indicating the predetermined receiving condition.

As described above, the measurement of the desired wave signal-to-noise signal ratio is performed utilizing the fact that the amplitude of a desired wave is not modulated.

Other than such influence caused by noise, there are amplitude changes due to a multiple reflex (multi-path) of a wave propagation path, fading and interference from adjacent channels. This type of amplitude change exists largely at a low band and a high band in frequency spectrum from generation mechanism thereof. Also, since this influence does not appear much in an intermediate band (intermediate frequency band), only this intermediate band is extracted by a band pass filter 18.

Thus, even a conventional receiver such as the above described example is capable of correctly measuring and determining a receiving condition and deriving a favorable demodulated signal, even if many noise components are included in a received signal.

However, the above prior art receiver need to assign a lot of channels in a limited frequency range, so that when an intermediate frequency amplifier circuit is set to a narrow bandwidth, signal components of a predetermined angle modulated signal are mixed with a desired wave when a changing amount of the amplitude value of a received signal is to be detected, thereby preventing a correct measurement of a receiving condition.

FIGS. 2A–2C illustrate the relationships between the time and the frequency of respective signals in the receiver shown in FIG. 1. Specifically, FIG. 2A illustrates the relationship between the frequency of a desired wave, i.e., a received signal and the time, FIG. 2B illustrates the relationship between the gain of the intermediate frequency amplifier circuit 13 and the frequency of an angle modulated signal; and FIG. 2C illustrates the relationship between an output signal of the amplitude detector circuit 16 and the time. As for the desired wave or the received signal, since respective band widths of the antenna 1, the high frequency amplifier circuit 11 and the frequency convertor circuit 12 are wide, its gain does not depend upon the frequency so that amplitude modulation is not added to the desired wave.

On the other hand, amplitude modulation of angle modulated signal components can be added to the output signal of the intermediate frequency amplifier circuit 13 set to a narrow bandwidth, as shown in FIG. 2B, whereby the same components are outputted from the amplitude detector circuit 16 as shown in FIG. 2C. These components are too small to cause problems when the intermediate frequency amplifier circuit 13 is set to a wide bandwidth, whereas, when the circuit 13 is set to a narrow bandwidth, such components possibly incur a problem that a correct receiving condition cannot be detected from the output of the amplitude detector circuit 16.

SUMMARY OF THE INVENTION

The present invention has been made in view of the above problems of the prior art, and its object is to provide an improved receiver which is capable of correctly measuring and determining a receiving condition even when an intermediate frequency amplifier circuit is set to a narrow bandwidth.

To achieve the above object, the receiver of the present invention, according to a first aspect, comprises function generator means coupled to receive a demodulated signal; first detector means for detecting an amplitude value of a received signal whose gain is controlled by an output signal of the function generator means; second detector means for detecting the magnitude of a change from an output signal of the first detector means; comparator means coupled to receive an output signal of the second detector means for comparing the output signal with a set value; and variable transmission means coupled to receive a demodulated signal controlled by an output signal of the comparator circuit.

According to a second aspect, a receiver comprises function generator means coupled to receive a demodulated signal; first detector means for detecting an amplitude value of a received signal; adder means for adding an output signal of the first detector means to an output signal of the function generator means; second detector means for detecting the magnitude of a change from an output signal from the adder means; comparator means coupled to receive an output of the second detector means at an input thereof; and variable transmission means controlled by an output of the comparator means and coupled to receive the demodulated signal at an input thereof.

According to a third aspect, a receiver comprises function generator means coupled to receive a demodulated signal; first detector means for detecting an amplitude value of a received signal; a low pass filter, the cut-off frequency of which is controlled by the function generator means, coupled to receive an output of the first detector means; second detector means coupled to receive an output signal from the low pass filter for detecting the magnitude of a change; comparator means coupled to receive an output signal of the second detector means for comparing the output signal with a set value; and variable transmission means controlled by an output signal of the comparator means and coupled to receive the demodulated signal.

According to a fourth aspect, a receiver comprises function generator means coupled to receive a demodulated signal; first detector means for detecting an amplitude value of a received signal; track/hold means controlled by the function generator means and coupled to receive an output signal of the first detector means; second detector means coupled to receive an output signal of the track/hold circuit for detecting the magnitude of a change; comparator means coupled to receive an output signal from the second detector means for comparing the output signal with a set value; and variable transmission means controlled by an output signal of the comparator means and coupled to receive the demodulated signal.

According to a fifth aspect, a receiver comprises function generator means coupled to receive a demodulated signal; first detector means for detecting an amplitude value of a received signal; second detector means, the gain of which is controlled by the function generator means, coupled to receive an output signal of the first detector means for detecting the magnitude of a change; comparator means coupled to receive an output signal of the second detector means for comparing the output signal with a set value; and variable transmitter means controlled by an output signal of the comparator means and coupled to receive the demodulated signal.

With the foregoing configurations, firstly, the function generator means, which generates a gain control signal for correcting the bandwidth characteristic of an intermediate frequency amplifier means by a demodulated signal proportional to the frequency of a received signal, detects and controls an amplitude value of the received signal, so that angle modulation related components are canceled and will not appear in an output signal, whereby a receiving condition can be correctly measured and determined by the (second detector) means for detecting this changing amount, the comparator means and the variable transmission means.

Secondly, an output signal of the function generator means for generating an addition signal for correcting the bandwidth characteristic of the intermediate frequency amplifier means from a demodulated signal proportional to the frequency of a received signal is added to an output of the (first detector) means for detecting an amplitude value of the received signal by the adder means, whereby angle modulation related components in an output signal are canceled and will not appear, so that a receiving condition can be correctly measured and determined by the (second detector) means for detecting this changing amount, the comparator means and the variable transmission means.

Thirdly, the function generator means for decreasing the cut-off frequency of the low pass filter in the vicinity of both corners of the bandwidth characteristic of intermediate frequency amplifier means at which a gain changing amount begins to increase, controls the variable frequency low pass filter at the rear of the (first detector) means for detecting an amplitude value of a received signal so as to prevent outputting of rapidly changing components related to angle modulation, when frequency deviation is large, whereby a receiving condition can be correctly measured and determined by the (second detector) means for detecting this changing amount, the comparator means and the variable transmitter means.

Fourthly, the function generator means for generating, from a demodulated signal proportional to the frequency of a received signal, a control signal for switching, in the vicinity of both corners of the bandwidth characteristic of intermediate frequency amplifier means at which a gain changing amount begins to increase, the track/hold means from a track state in which an inputted signal is transmitted as it is to a hold state in which an instantaneous value at that time is held therein, controls the track/hold means at the rear of the (first detector) means for detecting an amplitude value of the received signal to maintain angle modulation related components in the hold state and prevent the same from being outputted when frequency deviation is large, whereby a receiving condition can be correctly measured and determined by the (second detector) means for detecting this changing amount, the comparator means and the variable transmission means.

Fifthly, the function generator means for generating, from a demodulated signal proportional to the frequency of a received signal, a control signal for reducing the gain of the second detector means in the vicinity of both corners of the bandwidth characteristic of intermediate frequency amplifier means at which a gain changing amount begins to increase, controls the (second detector) means for detecting a changing amount at the rear of the (first detector) means for detecting an amplitude value of the received signal to reduce a detection gain only when angle modulation related components are present when frequency deviation is large and prevent the changing amount detector means from detecting a changing amount, whereby a receiving condition can be correctly measured and determined by the comparator means and the variable transmission means.

BRIEF DESCRIPTION OF THE DRAWINGS

FIGS. 2A–2C are graphs illustrating the relationships between the time and the frequency of signals in respective parts of the receiver shown in FIG. 1;

FIGS. 4A–4E are graphs illustrating the relationship between the time and the frequency of signals in the first embodiment;

DESCRIPTION OF THE PREFERRED EMBODIMENTS

Embodiments of a receiver according to the present invention will hereinafter be described in detail in connection with the accompanying drawings.

Figure 1:
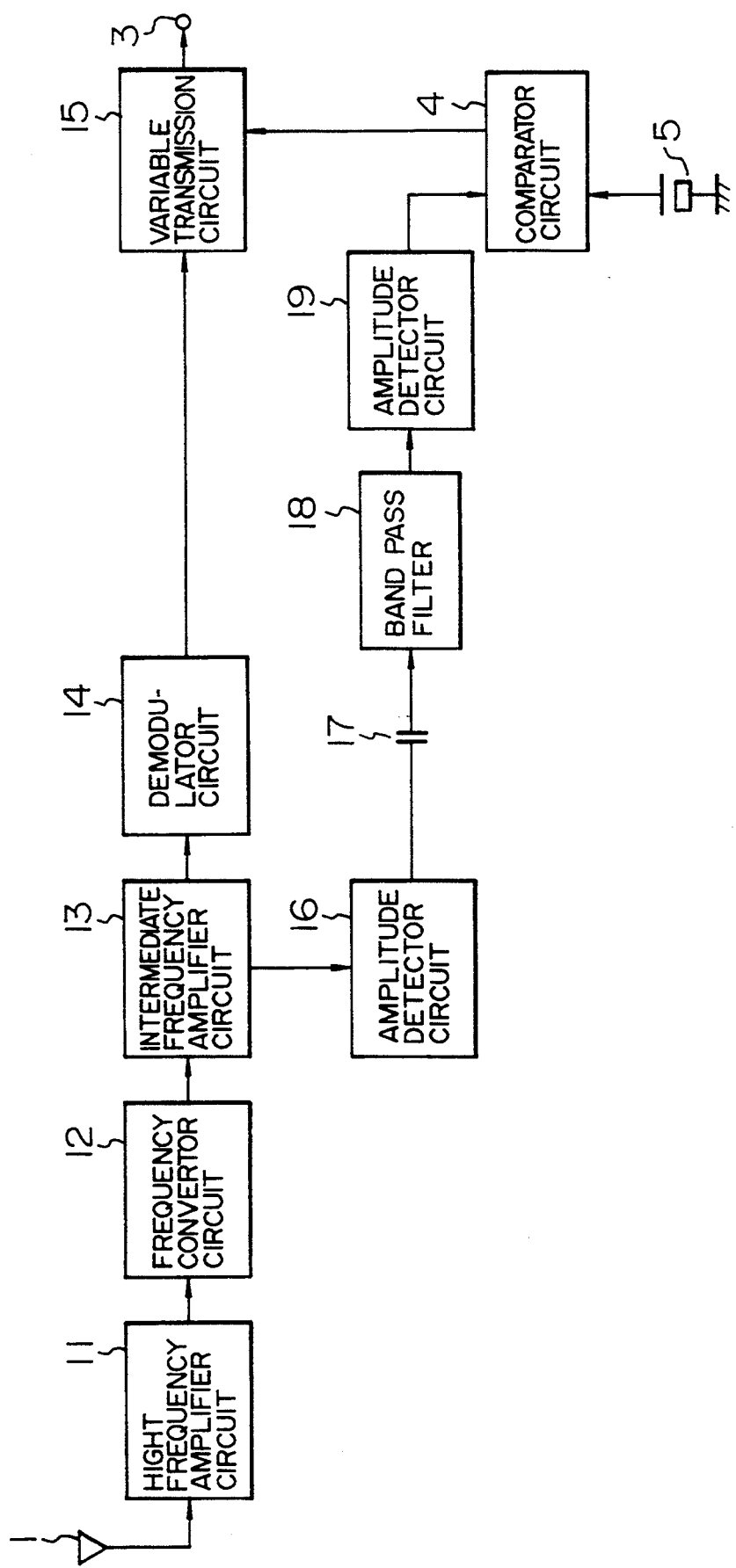
FIG. 1 is a block diagram illustrating the configuration of a conventional receiver.

Incidentally, in embodiments shown in FIGS. 3–12, the same components as those of the conventional receiver shown in FIG. 1 are designated with the same reference numerals and a repetitive explanation will be omitted.

Figure 3:
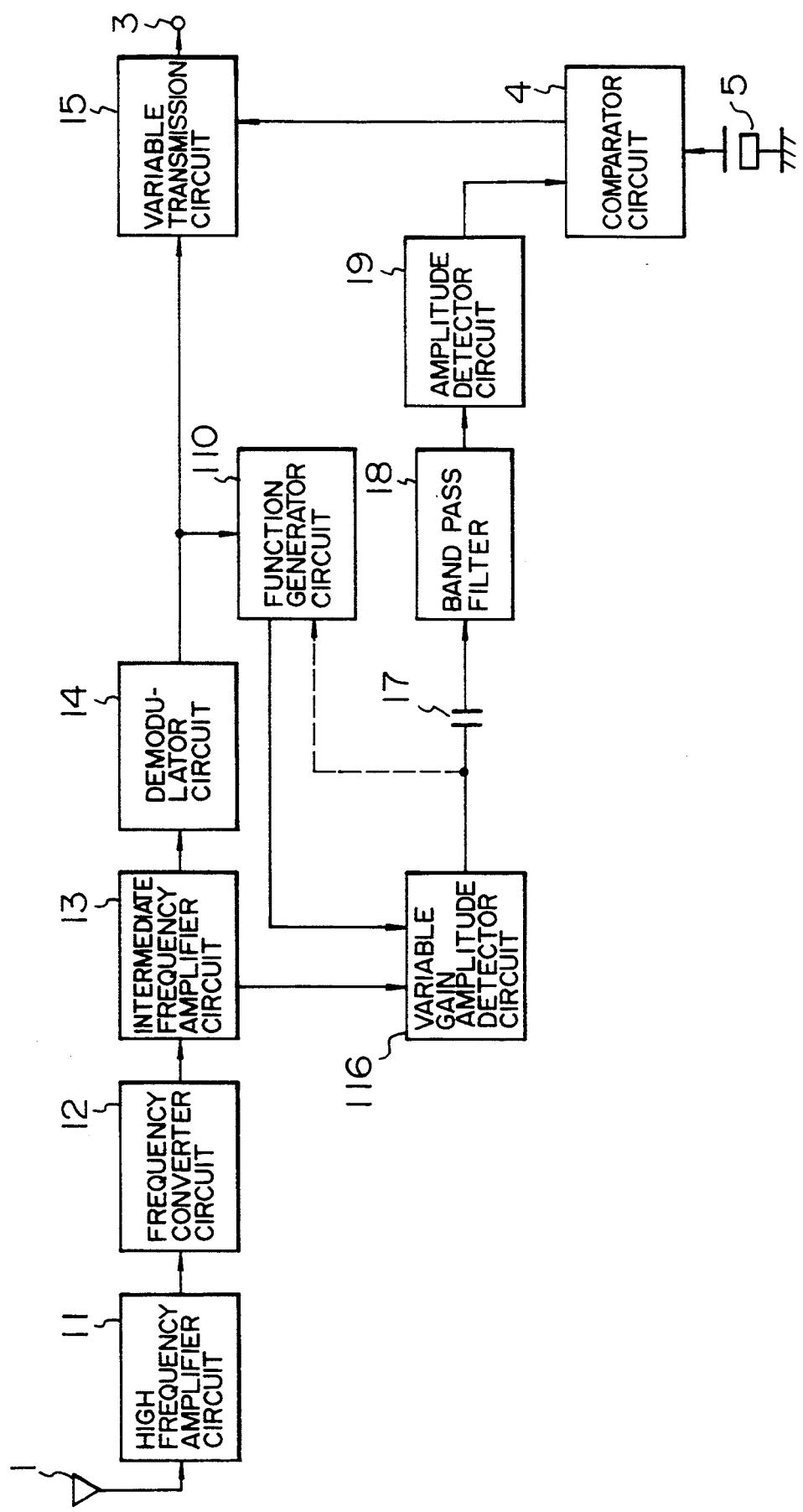
FIG. 3 is a block diagram illustrating the configuration of a first embodiment of a receiver according to the present invention.

FIG. 3 illustrates the configuration of a first embodiment.

In FIG. 3, reference numeral 1 designates an antenna, 11 a high frequency amplifier circuit for amplifying a received signal from the antenna 1, 12 a frequency convertor circuit for converting the received signal from the high frequency amplifier circuit 11 to an intermediate frequency signal, 13 an intermediate frequency amplifier circuit for amplifying the converted intermediate frequency signal, 14 a demodulator circuit for deriving a demodulated signal from the intermediate frequency signal, and 15 a variable transmission circuit for controlling the demodulated signal to be outputted to an output terminal 3.

Also, reference numeral 116 designates a variable gain amplitude detector circuit (corresponding to first detecting means) for detecting an amplitude value of a received signal, 17 a capacitor, 18 a band pass filter, 19 a second amplitude detector circuit (corresponding to second detecting means) for detecting an amplitude value of the received signal outputted from the variable gain amplitude detector circuit 116 and detecting a change amount of the amplitude of the received signal in cooperation with the capacitor 17 and the band pass filter 18.

Further, reference numeral 110 designates a function generator circuit which receives a demodulated signal from the demodulator circuit 14 proportional to the frequency of the desired wave reception signal and generates a gain control signal for importing the reverse characteristic of the bandwidth characteristic of the intermediate frequency amplifier circuit 13 to first variable gain amplitude detector 116. The first variable gain amplitude detector circuit 116 inputs the gain control signal supplied from the function generator circuit 110, and detects an amplitude value of the desired wave reception signal, with its gain being controlled by the gain control signal.

Reference numeral 4 designates a comparator circuit for comparing an output of the second amplitude detector circuit 19 with a threshold value set by a voltage source 5 to control the variable transmission circuit 15 to a transmitting state, if a receiving condition is good, thereby outputting a demodulated signal from the demodulator circuit 14 to the output terminal 3.

Next, the operation of the receiver thus constructed will be explained.

FIGS. 4A–4E illustrates the relationships between the time and the frequency of signals generated in the first embodiment.

FIG. 4A, illustrating the relationship between the time and the frequency of a desired wave or a received signal, represents a state where the high frequency amplifier circuit 11 and the frequency convertor circuit 12 are set to a wide bandwidth so that the gain of the received signal does not depend on the frequency, and accordingly amplitude modulation is not added to the desired wave or received signal.

FIG. 4B, illustrating the relationship between the gain of the intermediate frequency amplifier circuit 13 with the frequency of an angle modulated signal, represents a state where an amplitude modulated signal in this bandwidth characteristic is inputted in the demodulator circuit 14.

FIG. 4C illustrates the relationship between the gain of the variable gain amplitude detector circuit controlled by the function generator circuit 110 and the frequency of an angle modulated signal. In this case, from a demodulated signal from the demodulator circuit 14 a gain control signal generated by the function generator circuit 110 is generated, the characteristic of which is reverse to the bandwidth characteristic of the intermediate frequency amplifier circuit 13, whereby the gain of the variable gain amplitude detector circuit 116 is given this bandwidth characteristic.

FIG. 4D illustrates the relationship between an output of the variable gain amplitude detector circuit 116 and the frequency of the angle modulated signal. The bandwidth characteristic of the gain at the intermediate frequency amplifier circuit 13 is synthesized with the bandwidth characteristic of the gain at the variable gain amplitude detector circuit 116, and the resulting total gain becomes flat in a frequency range in which the frequency of the desired wave or the received signal may vary.

FIG. 4E illustrates the relationship between the output of the variable gain amplitude detector circuit 116 and the time, where angle modulation related components in the desired wave or received signal are removed by correction.

Thus, as described above, the output signal from a circuit composed of the capacitor 17, the band path filter 18 and the amplitude detector circuit 19 for detecting a changing amount of an amplitude value of a received signal is not mixed with angle modulation related components, thereby making it possible to correctly measure a receiving condition. As a result, if the comparator circuit 4 determines a good receiving condition, the comparator circuit 4 controls the variable transmission circuit 15 to a transmitting state to output a demodulated signal from the demodulator circuit 14 to the output terminal 3.

In the first embodiment, the gain of the variable gain amplitude detector circuit 116 for detecting an amplitude value of a received signal is controlled by the output signal of the function generator circuit 110 so as to cancel the bandwidth characteristic at the intermediate frequency amplifier circuit 13, which can make flat the total bandwidth characteristic at the circuit for detecting an amplitude value of a received signal, whereby angle modulation related components are removed from the desired wave or received signal and therefore a received condition can be correctly measured.

Also, in the first embodiment, the intermediate frequency amplifier circuit 13 is provided with a lot of band pass filters which may be utilized, when the bandwidth characteristic fluctuates greatly due to changes in the amplitude of a received signal, to relate an amplitude value in a function of the function generator circuit 110, as indicated by a broken line, thereby enabling a precise correction.

Figure 5:
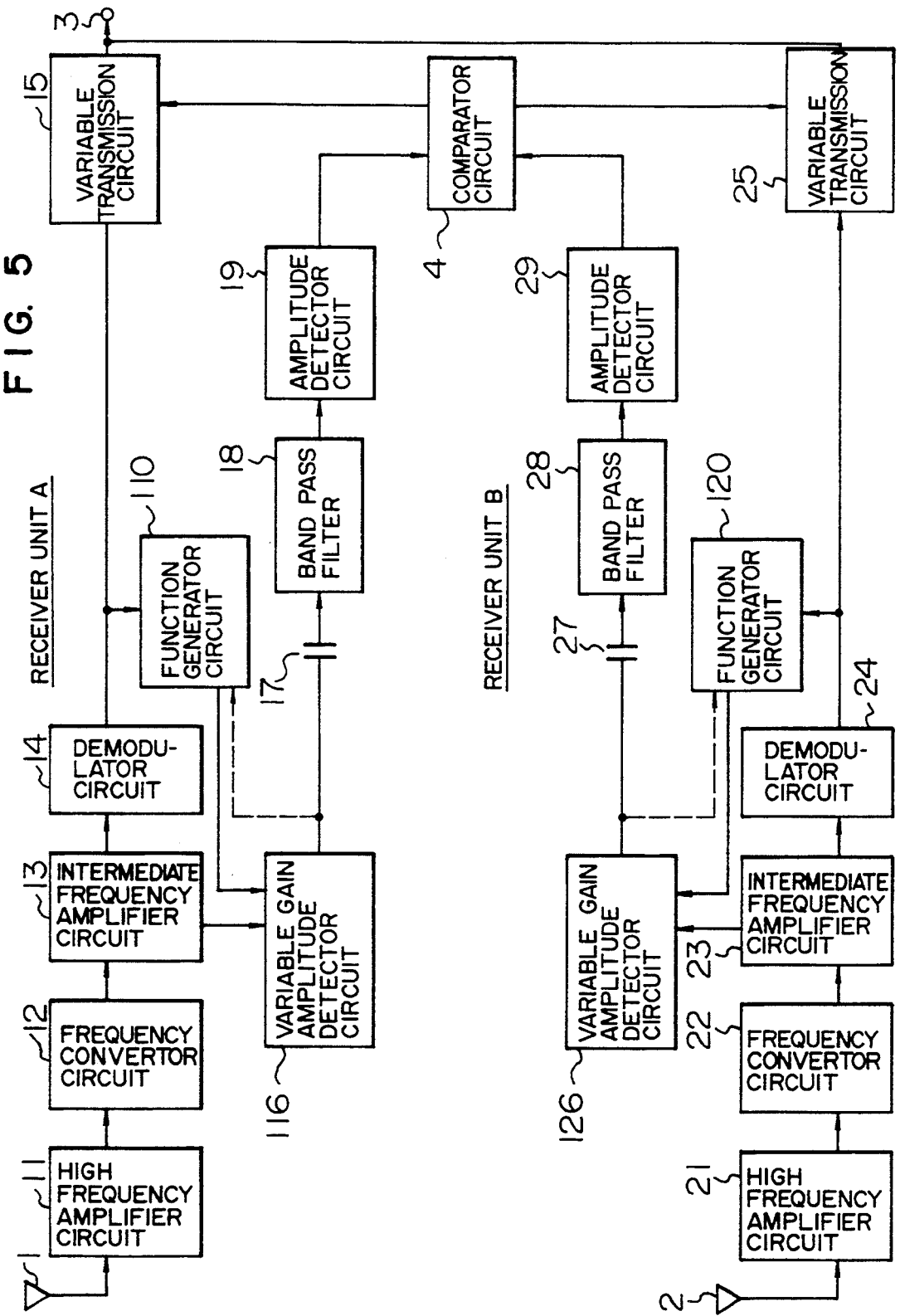
FIG. 5 is a block diagram illustrating the configuration of a second embodiment.

FIG. 5 illustrates the configuration of a second embodiment.

The second embodiment, in which the first embodiment is applied to a diversity reception system, comprises two receiver units A, B constructed as shown in FIG. 3.

In FIG. 5, reference numerals 1 and 2 designate antennas, 11 and 21 high frequency amplifier circuits for amplifying received signals from the antennas 11, 21, 12 and 22 frequency convertor circuits for converting the amplified received signals to intermediate frequency signals, 13 and 23 intermediate frequency amplifier circuits for amplifying the intermediate frequency signals, 14 and 24 demodulator circuits for deriving demodulated signals from the amplified intermediate frequency signals, and 15 and 25 variable transmission circuits for outputting demodulated signals to an output terminal 3.

Also, reference numerals 116 and 126 designate variable gain amplitude detector circuits (corresponding to first detector circuits) for detecting amplitude values of received signals, 17 and 27 capacitors, 18 and 28 band pass filters, and 19 and 29 amplitude detector circuits (corresponding to second detector circuits) for detecting change amounts of the amplitude values of the received signals in cooperation with the capacitors 19, 29 and the band pass filters 18, 28.

Further, reference numerals 110, 120 designate a function generator circuits which receive demodulated signals from the demodulator circuits 14, 24 proportional to the frequencies of the desired waves or reception signals and generate gain control signal for importing the reverse characteristics of the bandwidth characteristics of the intermediate frequency amplifier circuits 13, 23 to the first variable gain amplitude detector circuits 116,126. The first variable gain amplitude detector circuits 116,126 input the gain control signals supplied from the function generator circuits 110,120 and detect amplitude values of the desired wave reception signals with their gain being controlled by the gain control signals.

Furthermore, reference numeral 4 designates a comparator circuit for comparing receiving conditions of the receiver units A, B with each other to output a better demodulated signal from the receiver unit A or B through the variable transmitter circuit 15 or 25 to an output terminal 3.

In this event, although demodulated signals from the demodulator circuits 14, 24 are used as input signals to the function generator circuits 110, 120 in this embodiment, a diversity selected signal at the output terminal 3 may be utilized as these input signals.

With the configuration described above, even if a receiving condition of either the receiver unit A or the receiver unit B becomes worse, a precise correction can be performed for the bandwidth.

In the foregoing diversity reception system, it is also possible to correctly measure a receiving condition without influence of angle modulation related components in a desired wave or received signal.

Figure 6:
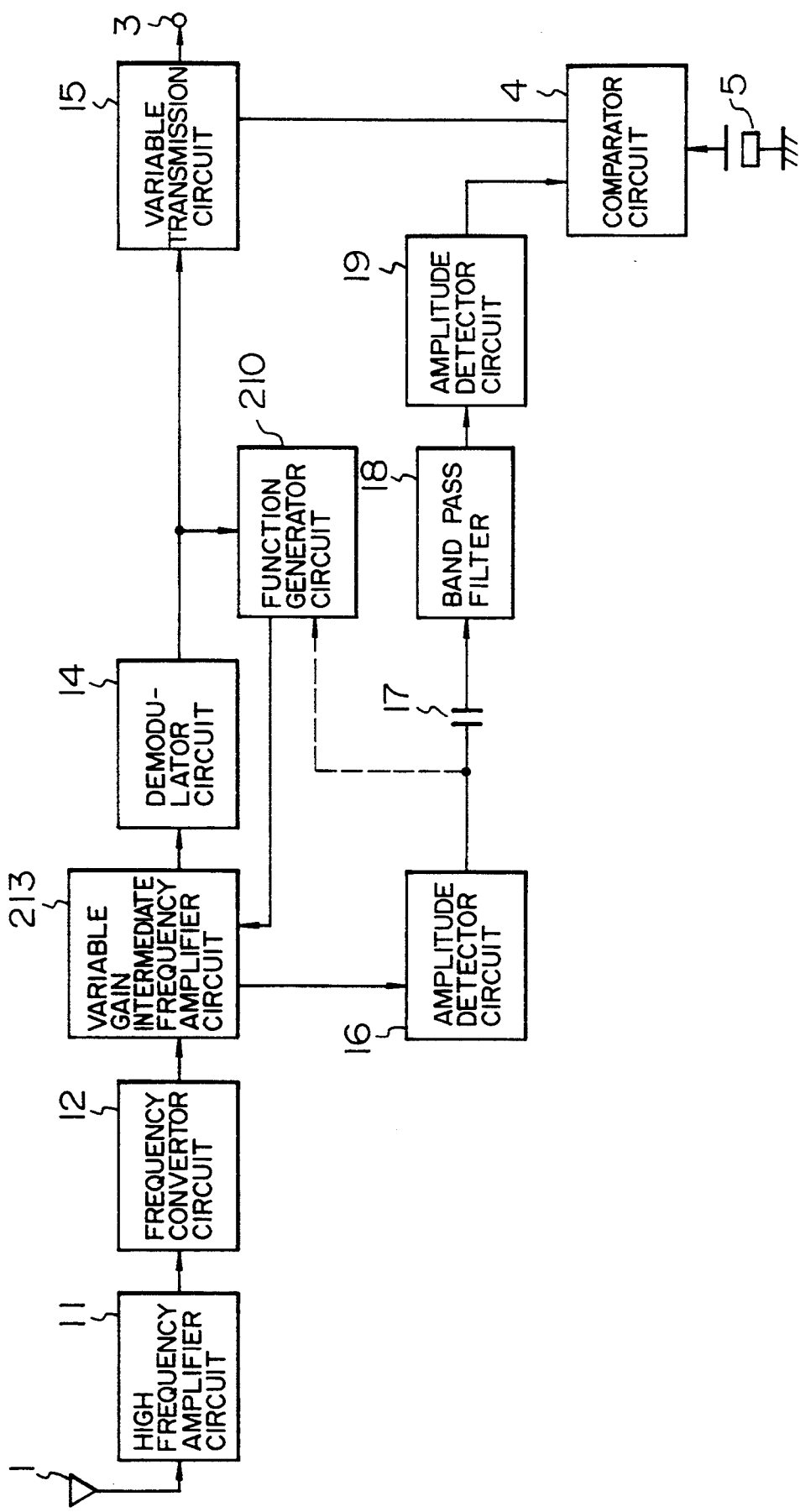
FIG. 6 is a block diagram illustrating the configuration of a third embodiment.

FIG. 6 illustrates the configuration of a third embodiment.

In the third embodiment, a circuit for detecting an amplitude value of a received signal is composed of a high frequency amplifier circuit 11, a frequency convertor circuit 12, a variable gain intermediate frequency amplifier circuit 213, and an amplitude detector circuit 16 such that a correction of the bandwidth characteristic is performed by the variable gain intermediate frequency amplifier circuit 213. A function generator circuit 210 provides a function for accomplishing an optimal correction with this configuration.

Figure 7:
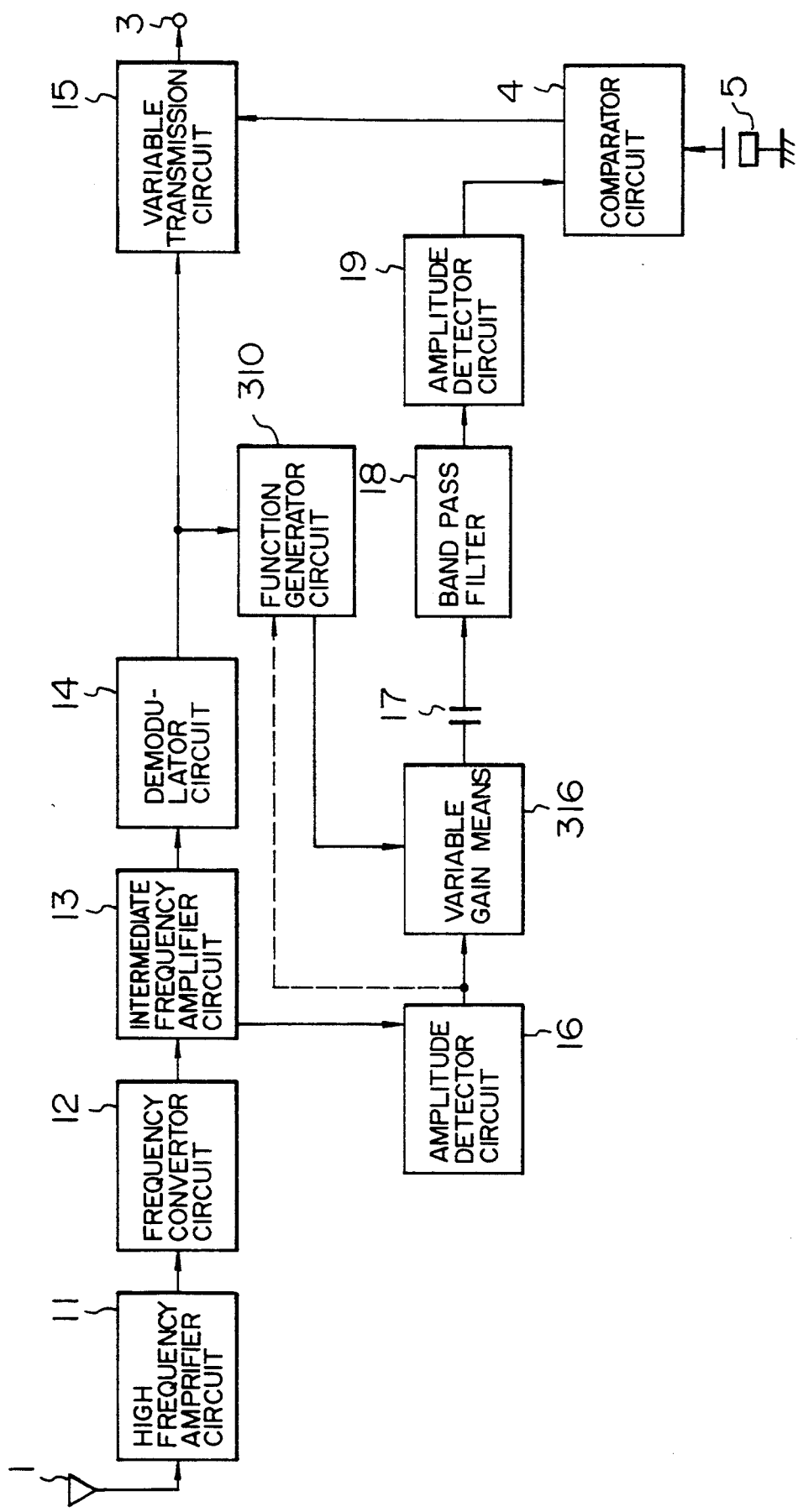
FIG. 7 is a block diagram illustrating the configuration of a fourth embodiment.

FIG. 7 illustrates the configuration of a fourth embodiment.

In the fourth embodiment, the circuit for detecting an amplitude value of a received signal in the first embodiment is composed of a high frequency amplifier circuit 11, a frequency convertor circuit 12, an intermediate frequency amplifier circuit 13, an amplitude detector circuit 16 and a variable gain circuit 316, in a manner that a correction of the bandwidth characteristic is performed by the variable gain circuit 316. A function generator circuit 310 provides a function for accomplishing an optimal correction with this configuration.

As described above, the first, second, third and fourth embodiments control the gain of the circuit for detecting an amplitude value of a received signal by a function generator circuit and correct the bandwidth characteristic of itself to eliminate the influence of angle modulation related components in a desired wave or received signal.

Figure 8:
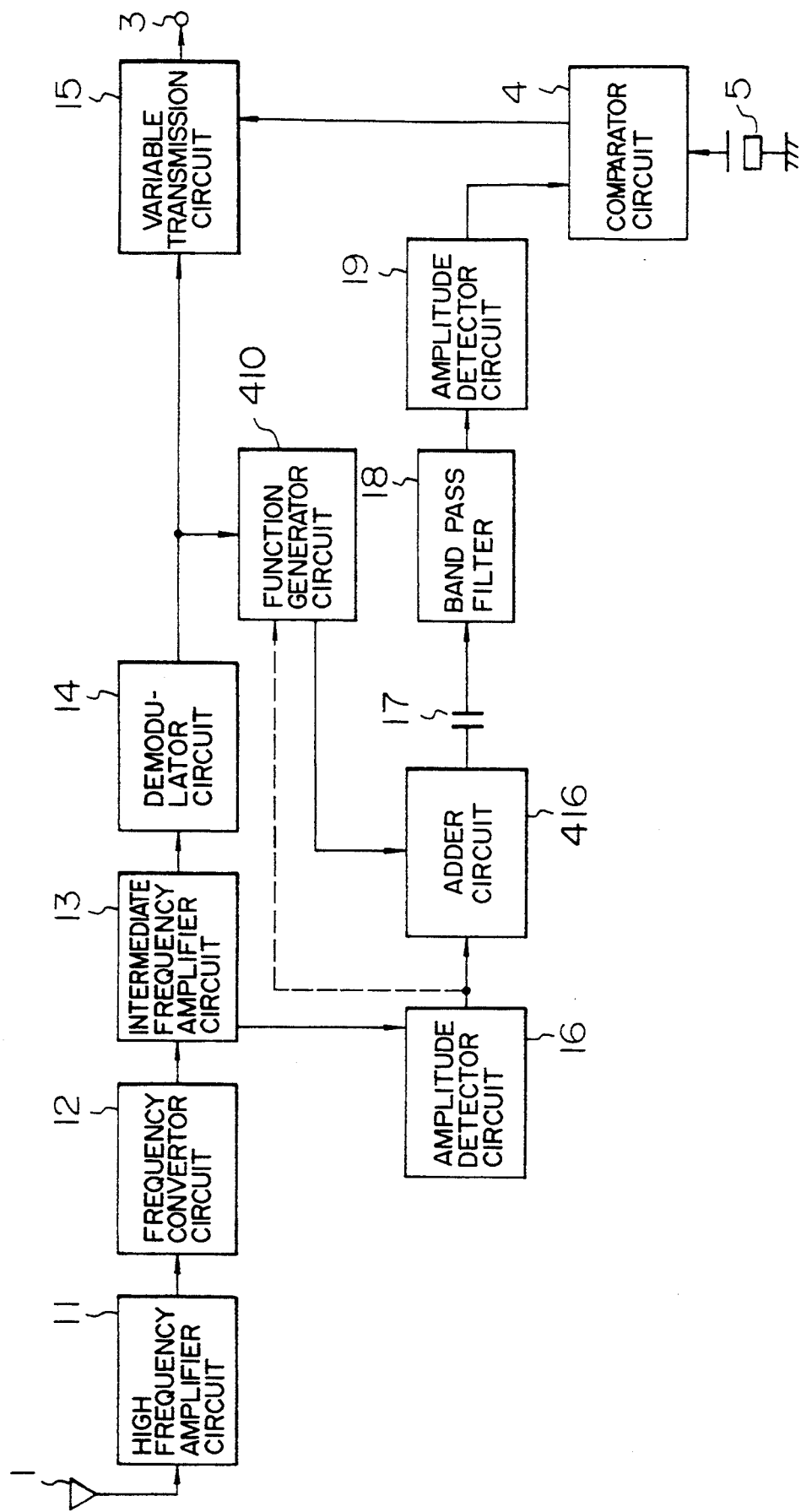
FIG. 8 is a block diagram illustrating the configuration of a fifth embodiment.

FIG. 8 illustrates the configuration of a fifth embodiment.

In the fifth embodiment, an adder circuit 416 is added at the rear of a circuit for detecting an amplitude value of a received signal composed of a high frequency amplifier circuit 11, a frequency convertor circuit 12, an intermediate frequency amplifier circuit 13 and an amplitude detector circuit 16. The adder circuit 416 has one input terminal coupled to receive a signal having the same level as but the opposite polarity as angle modulation related components in a desired wave or received signal, the signal being generated by the function generator circuit 410 from a demodulated signal inputted thereto, whereby these components are canceled.

In this embodiment, since a waveform corrected by the adder circuit 416 changes larger than an amplitude value of a received signal, a correction can be made by relating an amplitude value in a function of the function generator circuit 410.

However, if the amplitude value of a received signal is substantially proportional to a logarithm of a voltage of the received signal, the addition corrected waveform is not influenced by the level of the amplitude value of the received signal, so that a correction can be performed without preparing such a function.

This embodiment also permits a correct measurement of a receiving condition without being influenced by angle modulation related components in a desired waveform or received signal.

Figure 9:
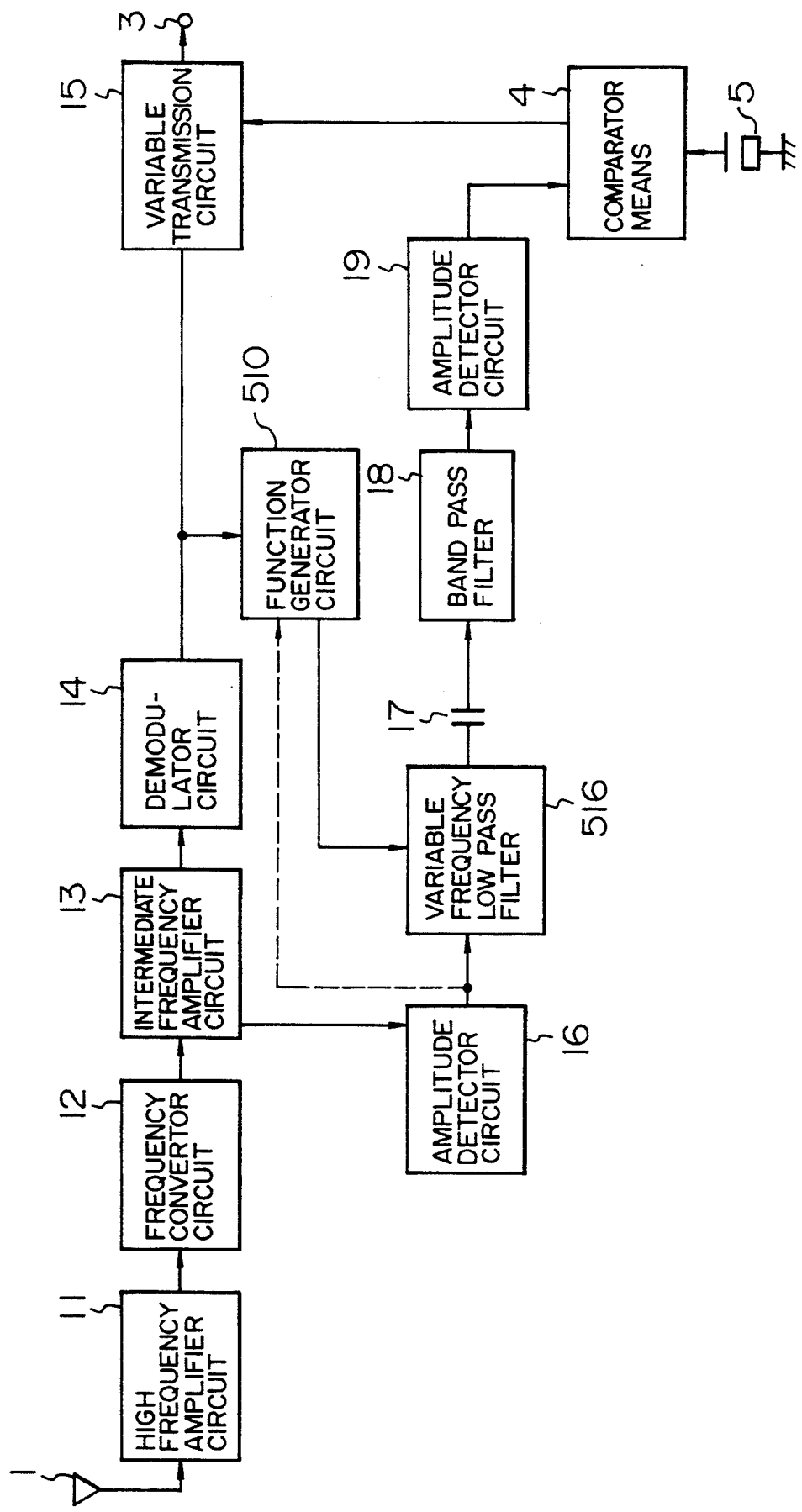
FIG. 9 is a block diagram illustrating the configuration of a sixth embodiment.

FIG. 9 illustrates the configuration of a sixth embodiment.

In the sixth embodiment, a variable frequency low pass filter 516 is inserted at the rear of a circuit for detecting an amplitude value of a received signal composed of a high frequency amplifier circuit 11, a frequency convertor circuit 12, an intermediate frequency amplifier circuit 13 and an amplitude detector circuit 16. The cut-off frequency of the variable frequency low pass filter 516 is controlled by a function generator circuit 510 such that when the frequency of a desired wave or a received signal increases or decreases, and an intermediate frequency signal reaches a frequency at which a changing amount of the gain of an intermediate frequency signal begins to increase, which is represented by both corners of the bandwidth characteristic of the intermediate frequency amplifier circuit 13, the cut-off frequency is gradually decreased.

Therefore, in an extent where frequency deviation of a desired wave or received signal becomes larger and the amplitude value of the received signal varies, this variation cannot pass through the variable frequency low pass filter 516, and as a result the influence of angle modulation related components in the desired wave or received signal will not appear at the input of the circuit for detecting a changing amount of the amplitude value of the received signal at the rear stage, thereby making it possible to correctly measure a receiving condition.

Figure 10:
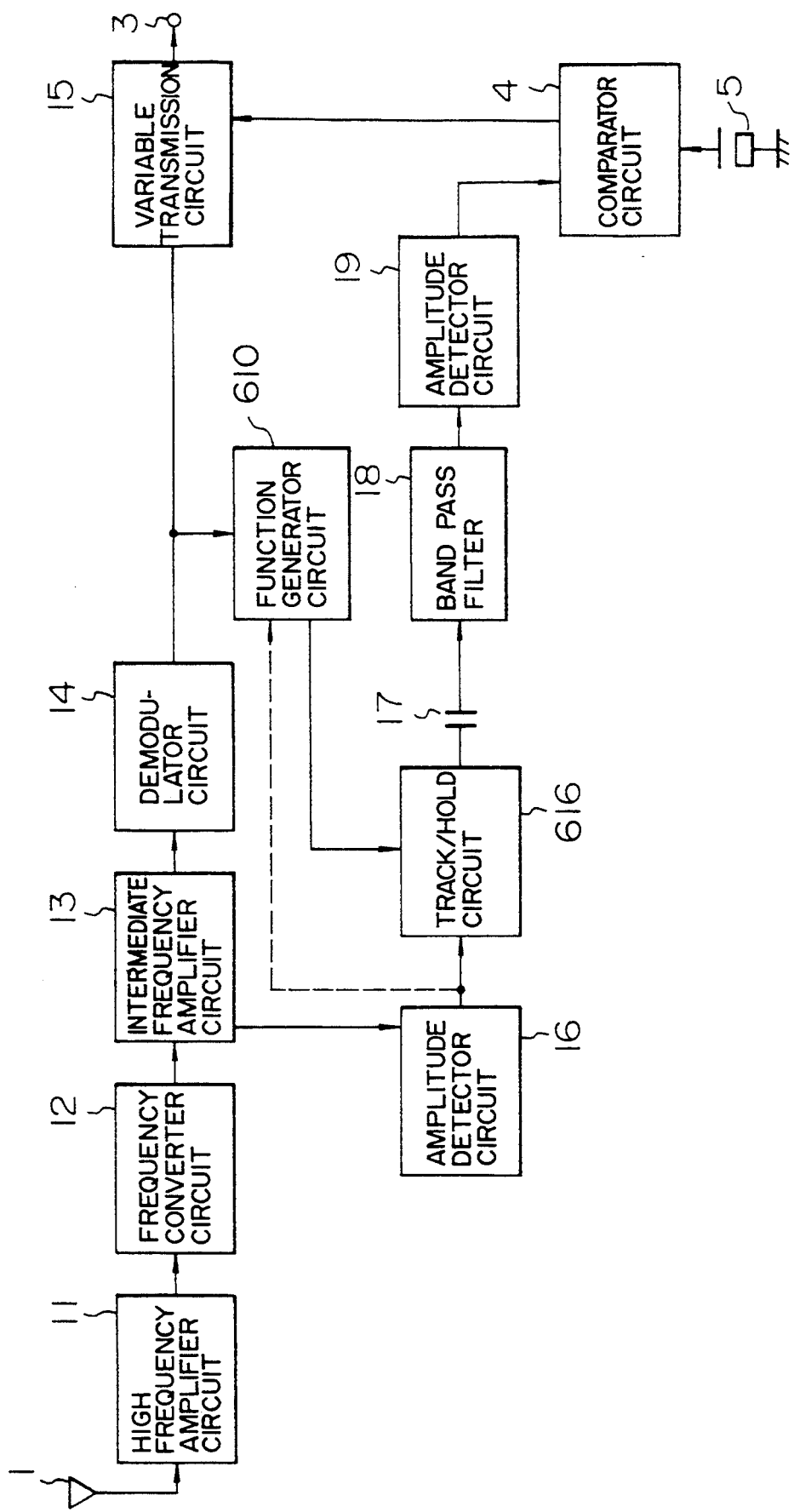
FIG. 10 is a block diagram illustrating the configuration of a seventh embodiment.

FIG. 10 illustrates the configuration of a seventh embodiment.

In the seventh embodiment, a track/hold circuit 616 is inserted at the rear of a circuit for detecting an amplitude value of a received signal composed of a high frequency amplifier circuit 11, a frequency convertor circuit 12, an intermediate frequency amplifier circuit 13 and an amplitude detector circuit 16.

A track state and a hold state of the track/hold circuit 616 is controlled by a function generator circuit 610 such that when the frequency of a desired wave or a received signal increases or decreases, and an intermediate frequency signal reaches a frequency at which a changing amount of the gain of an intermediate frequency signal begins to increase, which is represented by both corners of the bandwidth characteristic of the intermediate frequency amplifier circuit 13, the track/hold circuit 616 is switched from the track state to the hold state.

Therefore, in an extent where frequency deviation of a desired wave or received signal becomes larger and the amplitude value of the received signal varies, a value held in the track/hold circuit 616 is outputted therefrom, and as a result the influence of angle modulation related components in the desired wave or received signal will not appear at the input of the circuit for detecting a changing amount of the amplitude value of the received signal at the rear stage, thereby making it possible to correctly measure a received condition.

Figure 11:
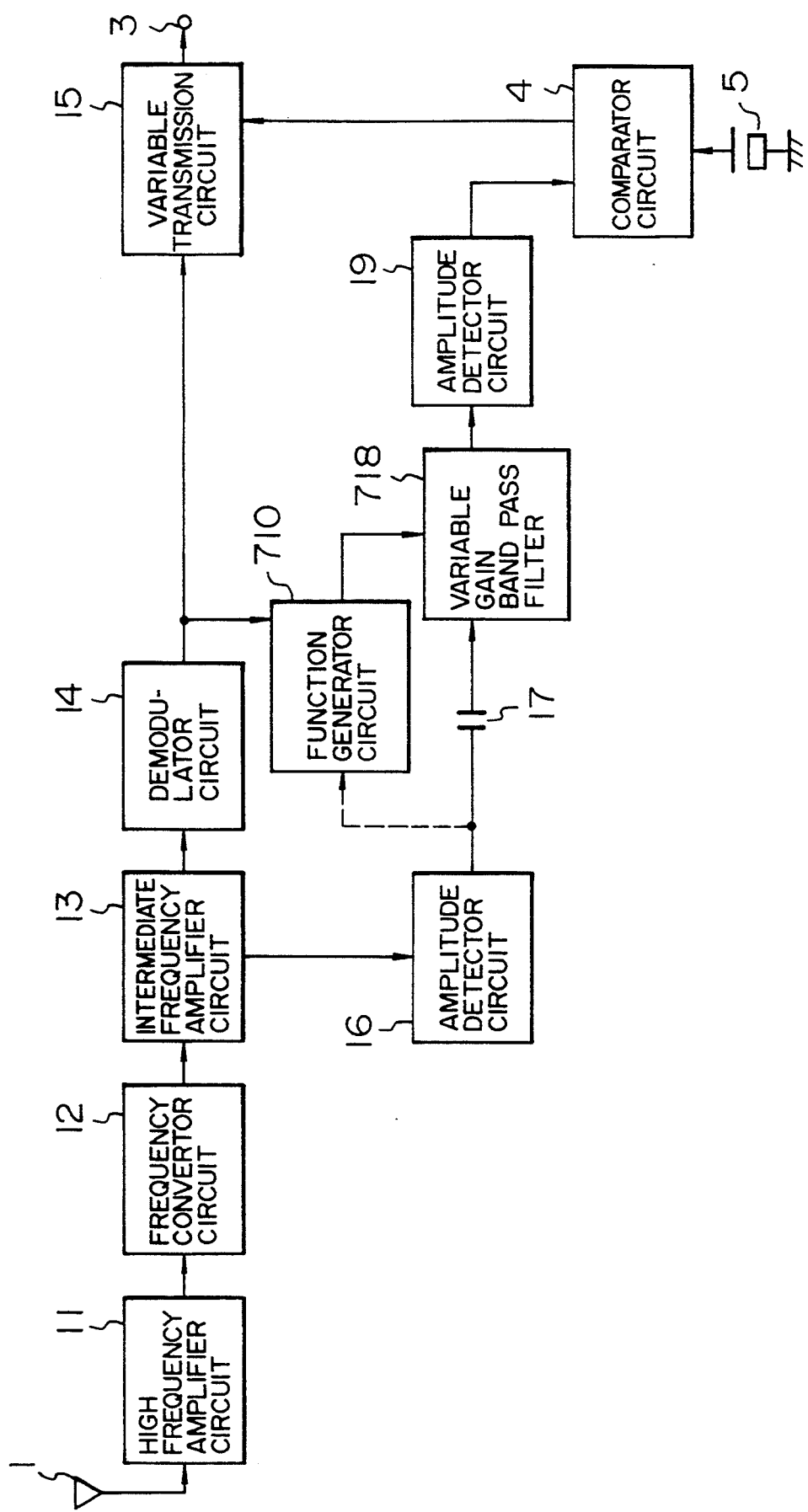
FIG. 11 is a block diagram illustrating the configuration of an eighth embodiment.

FIG. 11 illustrates the configuration of an eighth embodiment.

In the eighth embodiment, a capacitor 17, a variable gain band pass filter circuit 718 and an amplitude detector circuit 19 constitute a circuit for detecting a changing amount of an amplitude value. The gain of the variable gain band pass filter 178 is controlled by a function generator circuit 710 such that when the frequency of a desired wave or received signal increases or decreases and an intermediate frequency signal reaches a frequency at both corners of the bandwidth characteristic of the intermediate frequency amplifier circuit 13 at which a gain changing amount begins to increase, the gain of the variable gain band pass filter 718 is decreased.

Therefore, when frequency deviation of the desired wave or received signal becomes larger, and the amplitude of the received signal changes, this changing amount passes through the capacitor 17 and is inputted to the variable gain band pass filter 718. Since a changing amount of an output signal of the variable gain band pass filter 718 is restricted to be a small value by the function, generator circuit 710, as a result the influence of angle modulation related components in the desired wave or received signal will not appear, at the output terminal of the circuit for detecting a changing amount of the amplitude value of the received signal, thereby making it possible to correctly measure a receiving condition.

Figure 12:
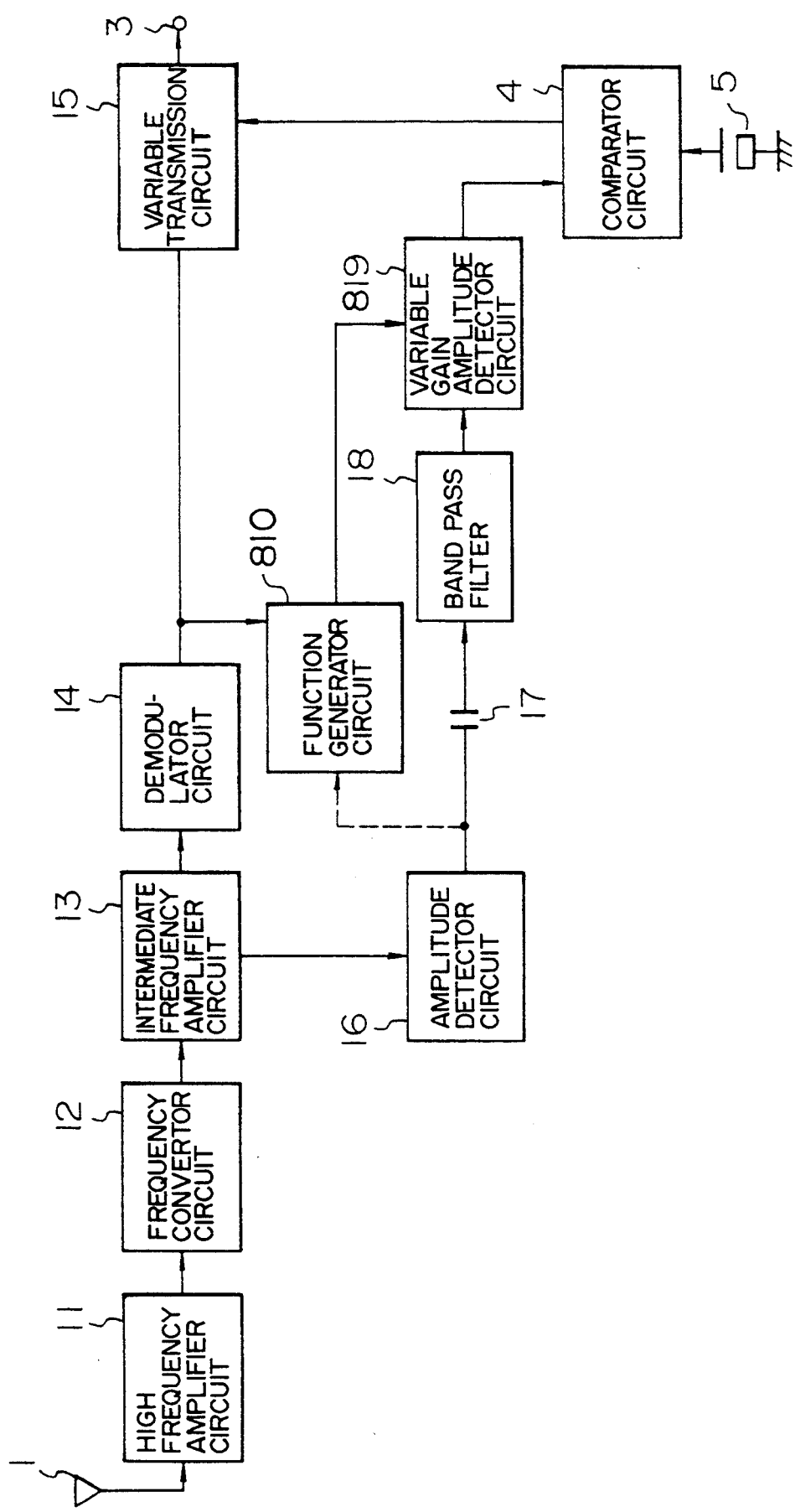
FIG. 12 is a block diagram illustrating the configuration of a ninth embodiment.

FIG. 12 illustrates the configuration of a ninth embodiment.

In the ninth embodiment, a capacitor 17, a band pass filter 18 and a variable gain amplitude detector circuit 819 constitute a circuit for detecting a changing amount of an amplitude value.

The gain of the variable gain amplitude detector circuit 819 is controlled by a function generator circuit 810, such that when the frequency of a desired wave or a received signal increases or decreases and an intermediate frequency signal reaches a frequency at both corners of the bandwidth characteristic of the intermediate frequency amplifier circuit 13 at which a gain changing amount begins to increase, the gain of the variable gain amplitude detector circuit 819 is decreased, in a manner similar to the eighth embodiment.

Therefore, when frequency deviation of the desired wave or received signal becomes larger, and the amplitude of the received signal changes, this changing amount passes through the capacitor 17 and the band pass filter 18, and is inputted to the variable gain amplitude detector circuit 819. Since the gain of the variable gain amplitude detector circuit 819 is restricted to be a small value by the function generator circuit 810, the influence of angle modulation related components in the desired wave or received signal will not appear, as a result, at the output terminal of the circuit for detecting a changing amount of the amplitude value of the received signal, thereby making it possible to correctly measure a receiving condition.

The eighth and ninth embodiments also control the gain of the circuit for detecting a changing amount of an amplitude value of a received signal by a function generator circuit, and utilize only a flat portion of the bandwidth characteristic of the intermediate frequency amplifier circuit to thereby avoid the influence of angle modulation related components in the desired wave or received signal. Incidentally, the second embodiment applies the first embodiment to a diversity reception system for determining which receiver unit presents a better receiving condition. This kind of application to the diversity reception system can also be implemented by the third, fourth, fifth, sixth, seven, eighth and ninth embodiments. Also, a comparator circuit may be added to these embodiment such that when either of receiver units presents a worsened receiving condition, demodulated outputs of both receiver units are prevented from being delivered to an output terminal.

Further, although in the diversity reception system of the second embodiment the function generator circuits are supplied, as input signals, with demodulated signals from the outputs of the demodulator circuits, the function generator circuits may be supplied with demodulated signals after diversity selection has been made.

In the respective function generator circuits, if it is desirable to increase a value representing a reduction of the influence of angle modulation related components in a desired wave or received signal, a signal related to the amplitude of the received signal may be incorporated in a function as indicated by broken lines in FIGS. 3, 5, 6, 7, 8, 9, 10, 11, 12.

The capacitors used in the first–ninth embodiments act to input to the band pass filter a changing amount of a voltage signal representing an amplitude value of a received signal in a current signal form. If the amplitude value of a received signal is obtained in a current signal form, this current signal is passed through an inductor, and a voltage across the terminals of the inductor is inputted to the band pass filter, whereby a similar changing amount can be derived. Furthermore, it is also possible to utilize the function of the band pass filter provided with a resonance circuit formed of parallel connection of an inductor and a capacitor.

I claim:

1. A receiver comprising:
    a frequency converter circuit for converting a received signal, received by said receiver, to an intermediate frequency signal;
    an intermediate frequency amplifier circuit, having a bandwidth characteristic, for receiving and amplifying the intermediate frequency signal;
    a demodulator circuit for receiving the amplified intermediate frequency signal and for generating a demodulated signal therefrom;
    function generator means, coupled to said demodulator circuit, for receiving the demodulated signal and for generating in response thereto a gain control signal indicative of a reverse characteristic of the bandwidth characteristic of said intermediate frequency amplifier circuit;
    first detector means, receiving the amplified intermediate frequency signal from said intermediate frequency amplifier circuit and the gain control signal from said function generator means, for detecting an amplitude value of the received signal of said receiver and providing an output signal having an amplitude determined by the gain control signal;
    second detector means for detecting a change ;amount of an amplitude value of the received signal of said receiver based on said output signal of said first detector means for providing an output signal indicating said change amount;
    comparator means, coupled to receive said output signal of said second detector means, for comparing the output signal of said second detector means with a set value and providing an output signal indicating a comparison result; and
    variable transmission means connected with said demodulator circuit to receive the demodulated signal therefrom and also connected with said comparator means to receive said output signal thereof, for modifying the received demodulated signal in accordance with said output signal of said comparator means.

2. A receiver comprising:
    a frequency converter circuit for converting a received signal, received by said receiver, to an intermediate frequency signal;
    an intermediate frequency amplifier circuit for receiving and amplifying the intermediate frequency signal;
    a demodulator circuit for receiving the amplified intermediate frequency signal and for generating a demodulated signal therefrom;
    function generator means, coupled to said demodulator circuit, for receiving said demodulated signal;
    first detector means, receiving the amplified intermediate signal from said intermediate frequency amplifier circuit, for detecting an amplitude value of the received signal of said receiver;
    adder means for adding an output signal of said first detector means to an output signal of said function generator means;
    second detector means for detecting a change amount of an amplitude value of the received signal of said receiver based on an output signal from said adder means;
    comparator means coupled to receive an output of said second detector means at an input thereof; and
    variable transmission means controlled by an output of said comparator means and coupled to receive the demodulated signal at an input thereof.

3. A receiver comprising:
    a frequency converter circuit for converting a received signal, received by said receiver, to an intermediate frequency signal;
    an intermediate frequency amplifier circuit for receiving and amplifying the intermediate frequency signal;
    a demodulator circuit for receiving the amplified intermediate frequency signal and for generating a demodulated signal therefrom;
    function generator means, coupled to said demodulator circuit, for receiving said demodulated signal and generating in response thereto a control signal;

first detector means, receiving the amplified intermediate signal from said intermediate frequency amplifier circuit, for detecting an amplitude value of the received signal of said receiver;

a low pass filter, the cut-off frequency of which is controlled by said control signal generated by said function generator means, coupled to receive an output of said first detector means;

second detector means, coupled to receive an output signal from said low pass filter, for detecting a change amount of an amplitude value of the received signal of said receiver based on said output signal of said low pass filter;

comparator means, coupled to receive an output signal of said second detector means, for comparing the output signal of said second detector means with a set value; and variable transmission means controlled by an output signal of said comparator means and coupled to receive the demodulated signal.

4. A receiver comprising:

a frequency converter circuit for converting a received signal, received by said receiver, to an intermediate frequency signal;

an intermediate frequency amplifier circuit for receiving and amplifying the intermediate frequency signal;

a demodulator circuit for receiving the amplified intermediate frequency signal and for generating a demodulated signal therefrom;

function generator means, coupled to said demodulator circuit, for receiving said demodulated signal and generating in response thereto a control signal;

first detector means, receiving the amplified intermediate signal from said intermediate frequency amplifier circuit, for detecting an amplitude value of a received signal of said receiver;

track/hold means controlled by said control signal of said function generator means and coupled to receive an output signal of said detector means;

second detector means, coupled to receive an output signal of said track/hold circuit, for detecting a change amount of an amplitude of the received signal of said receiver based on the output signal of said track/hold circuit;

comparator means, coupled to receive an output signal from said second detector means, for comparing the output signal of said second detector means with a set value; and variable transmission means controlled by an output signal of said comparator means and coupled to receive the demodulated signal.

5. A receiver comprising:

a frequency converter circuit for converting a received signal, received by said receiver, to an intermediate frequency signal;

an intermediate frequency amplifier circuit, having a bandwidth characteristic, for receiving and amplifying the intermediate frequency signal;

a demodulator circuit for receiving the amplified intermediate frequency signal and for deriving a demodulated signal therefrom;

function generator means, coupled to said demodulator circuit, for receiving said demodulated signal and generating in response thereto a control signal;

first detector means for detecting an amplitude value of the received signal of said receiver;

second detector means, the gain of which is controlled by said control signal of said function generator means, said second detector means coupled to receive an output signal of said first detector means for detecting a change amount of an amplitude value of the received signal of said receiver based on the output signal of said first detector means;

comparator means, coupled to receive an output signal of said second detector means, for comparing the output signal of said second detector means with a set value; and variable transmission means controlled by an output signal of said comparator means and coupled to receive the demodulated signal.

6. A receiver according to claim 1, wherein said function generator means includes a first input for receiving the demodulated signal and a second input for receiving the output of said first detector means.

7. A receiver according to claim 2, wherein said function generator means includes a first input for receiving the demodulated signal and a second input for receiving the output of said first detector means.

8. A receiver according to claim 3, wherein said function generator means includes a first input for receiving the demodulated signal and a second input for receiving the output of said first detector means.

9. A receiver according to claim 4, wherein said function generator means includes a first input for receiving the demodulated signal and a second input for receiving the output of said first detector means.

10. A receiver according to claim 5, wherein said function generator means includes a first input for receiving the demodulated signal and a second input for receiving the output of said first detector means.

* * * * *